US010963719B1

(12) United States Patent
Hantehzadeh et al.

(10) Patent No.: US 10,963,719 B1
(45) Date of Patent: Mar. 30, 2021

(54) OPTIMIZED VEHICLE LICENSE PLATE RECOGNITION

(71) Applicant: CCC INFORMATION SERVICES INC., Chicago, IL (US)

(72) Inventors: Neda Hantehzadeh, Chicago, IL (US); Christoph Plenio, Batavia, IL (US); Nazanin Makkinejad, Chicago, IL (US); Ruxiao Bao, Mountain View, CA (US)

(73) Assignee: CCC INFORMATION SERVICES INC., Chicago, IL (US)

( * ) Notice: Subject to any disclaimer, the term of this patent is extended or adjusted under 35 U.S.C. 154(b) by 65 days.

(21) Appl. No.: 16/291,609

(22) Filed: Mar. 4, 2019

(51) Int. Cl.
*G06K 9/00* (2006.01)
*G06K 9/32* (2006.01)
*G06K 9/62* (2006.01)
*G06N 3/08* (2006.01)
*G06N 3/04* (2006.01)

(52) U.S. Cl.
CPC ............. *G06K 9/32* (2013.01); *G06K 9/6259* (2013.01); *G06K 9/6267* (2013.01); *G06N 3/0454* (2013.01); *G06N 3/08* (2013.01); *G06K 2209/01* (2013.01); *G06K 2209/15* (2013.01)

(58) Field of Classification Search
CPC ...... G06K 9/32; G06K 9/6259; G06K 9/6267; G06K 2209/01; G06K 2209/15; G06N 3/0454; G06N 3/08
See application file for complete search history.

(56) References Cited

U.S. PATENT DOCUMENTS

| 2018/0121744 A1* | 5/2018 | Kim | G06K 9/325 |
| 2019/0228276 A1* | 7/2019 | Lei | G06N 3/08 |
| 2019/0251369 A1* | 8/2019 | Popov | G06K 9/342 |
| 2020/0125876 A1* | 4/2020 | Cai | G06F 17/18 |
| 2020/0193232 A1* | 6/2020 | Wang | G06N 3/04 |

OTHER PUBLICATIONS

Girshick, "Fast R-CNN", *Proceedings of the IEEE International Conference on Computer Vision (ICCV)*, 1440-1448, (2015).

(Continued)

*Primary Examiner* — Ping Y Hsieh
(74) *Attorney, Agent, or Firm* — Marshall, Gerstein & Borun LLP

(57) ABSTRACT

Techniques for optimizing vehicle license plate recognition in images and their decoding include training a set of convolutional neural networks (CNNs) by using images in which license plates are identified or labeled as a whole, rather than by license plate parts or key points, and rather than by the individual, segmented characters represented thereon. The trained CNNs may operate on target images of environments to localize images of license plates included therein and determine the issuing jurisdiction and/or ordered set of characters represented on detected license plates without utilizing character segmentation and/or per-character recognition techniques. As such, license plates depicted within target images are able to be detected and decoded with greater tolerances for lighting conditions, deformations or damages, occlusions, differing image resolutions, differing angles of capture, variations of other objects depicted within the images (such as dense or changing signage), etc.

20 Claims, 3 Drawing Sheets

(56) References Cited

OTHER PUBLICATIONS

Goel et al., "Vehicle registration plate recognition system using template matching", *International Conference on Signal Processing and Communication (ICSC)*, 315-318 (2013).
Guo et al., "License plate localization and character segmentation with feedback self-learning and hybrid binarization techniques", *IEEE Transactions on Vehicular Technology*, 57.3:1417-1424 (2008).
Gupta et al., "Number plate extraction using template matching technique", *International Journal of Computer Applications*, 88.3:40-44 (2014).
Li et al., "Reading car license plates using deep convolutional neural networks and LSTMs", arXiv preprint arXiv:1601.05610:1-17 (2016).
Wazalwar et al., "A design flow for robust license plate localization and recognition in complex scenes", *Journal of Transportation Technologies*, 2:13-21 (2012).
Zhang et al., "A license plate character segmentation method based on character contour and template matching", *Applied Mechanics and Materials*, 333-335:974-979 (2013).

\* cited by examiner

OPTIMIZED VEHICLE LICENSE PLATE RECOGNITION

TECHNICAL FIELD

This patent relates to optimized image processing systems, methods, and techniques for recognizing vehicle license plates, and more particularly, to image processing systems, methods, and techniques that detect and recognize or decode license plates without requiring a camera or sensor to be positioned at a pre-determined distance and/or angle from the target license plates, and with more tolerance and accuracy across varying environmental conditions within the images.

DESCRIPTION OF THE RELATED ART

Known image processing systems that detect and recognize vehicle license plates typically require a sensor or camera to be located at a particular distance and a particular angle from (or within respective pre-determined ranges thereof) an expected location of a vehicle license plate. For example, license plate detection and recognition systems that are utilized at toll booths, at parking garage entrances, on police cars, etc., are particularly located and focused on areas in space at which target license plates are expected to be located, e.g., when a corresponding vehicle is stopped at or passes through an area targeted by the camera and/or sensor.

Additionally, typical methodologies for license plate recognition typically are composed of a first step in which characters on a license plate are individually segmented from other characters, and a subsequent, second step in which each individually-segmented character is identified using Optical Character Recognition (OCR) or other per-character recognition or decoding techniques. Commonly utilized methods of segmenting characters on license plates for individual or per-character recognition/decoding include, for example, Connected Components (CC) and Histogram of Oriented Edges (HOG).

As such, currently known license plate recognition techniques are highly vulnerable to and influenced by the presence of various, variable environmental factors, such as when license plate characters are occluded or partially occluded, broken, distorted, and/or damaged; when images are captured in low light and/or in the presence of shadows; when applied to images of complex environments that have dense and/or dynamically changing signage, etc. Further, currently known license plate recognition techniques may be inaccurate or may even fail when a license plate is not disposed at an expected location on a vehicle, when a camera or sensor is misaligned, when images are blurry, not focused, and/or have low resolution, and the like.

SUMMARY

The present disclosure generally relates to systems, methods, and/or techniques for optimized vehicle license plate detection and recognition. Using the novel systems, methods, and/or techniques disclosed herein, vehicle license plates are able to be detected and recognized and/or decoded in images of varying environmental conditions and/or across varying position, angles, and/or physical configurations of license plates with respect to various positionings of detecting sensors and/or cameras. Significantly, the novel systems, methods, and/or techniques disclosed herein are able to detect and accurately decode depictions of license plates within images which are not able to be completely and accurately processed by known license plate detection and recognition techniques. The methods, systems, and/or techniques summarized below may include additional, less, or alternate components, functionality, and/or actions, including those discussed elsewhere herein.

In an embodiment, a method of detecting and decoding license plates within images includes applying, to an entirety of a set of data points of an image of an environment, a first convolutional neural network (CNN) trained to detect depictions of license plates within images, thereby detecting and identifying (e.g., localizing) a subset of the set of environment image data points that depicts a license plate of a vehicle within the environment image, where an indication of the subset of data points depicting the license plate is an output of the first CNN. The method further includes applying, to the subset of data points identified by the first CNN, a second CNN trained to identify at least one of respective issuing jurisdictions or respective sets of characters assigned to and presented on license plates, thereby identifying at least one of an issuing jurisdiction of or a set of assigned characters presented on the detected license plate, where an indication of the at least one of the issuing jurisdiction or the assigned set of characters of the detected license plate is an output of the second CNN. Additionally, the method includes transmitting the output of the second CNN or another indication of the identified at least one of the issuing jurisdiction or the set of characters of the detected license plate to at least one of a computing device or a user interface.

In an embodiment, an image processing system that detects and decodes license plates depicted within images includes one or more processors, and one or more tangible, non-transitory computer-readable storage media storing a first convolutional neural network (CNN) trained to detect depictions of license plates within images and storing a second CNN trained to identify at least one of respective issuing jurisdictions or respective sets of characters that are assigned to and presented on license plates. The computer-executable instructions stored on the one or more tangible, non-transitory computer-readable storage media, when executed by the one or more processors, cause the image processing system to apply the first CNN to a set of data points of an image of an environment to thereby detect and identify a subset of the set of environment image data points that depicts a license plate of a vehicle within the environment image, where an indication of the subset of data points depicting the license plate is an output of the first CNN; apply the second CNN to the subset of data points indicated by the output of the first CNN to thereby identify at least one of an issuing jurisdiction or an assigned set of characters of the license plate that are presented on the depicted license point, where an indication of the at least one of the issuing jurisdiction or the set of characters of the license plate is an output of the second CNN; and transmit the output of the second CNN or another indication of the identified at least one of the issuing jurisdiction or the set of characters of the license plate to at least one of a computing device or a user interface.

Advantages will become more apparent to those skilled in the art from the following description of the preferred embodiments which have been shown and described by way of illustration. As will be realized, the present embodiments may be capable of other and different embodiments, and their details are capable of modification in various respects.

Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts one embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

DETAILED DESCRIPTION

Figure 1:
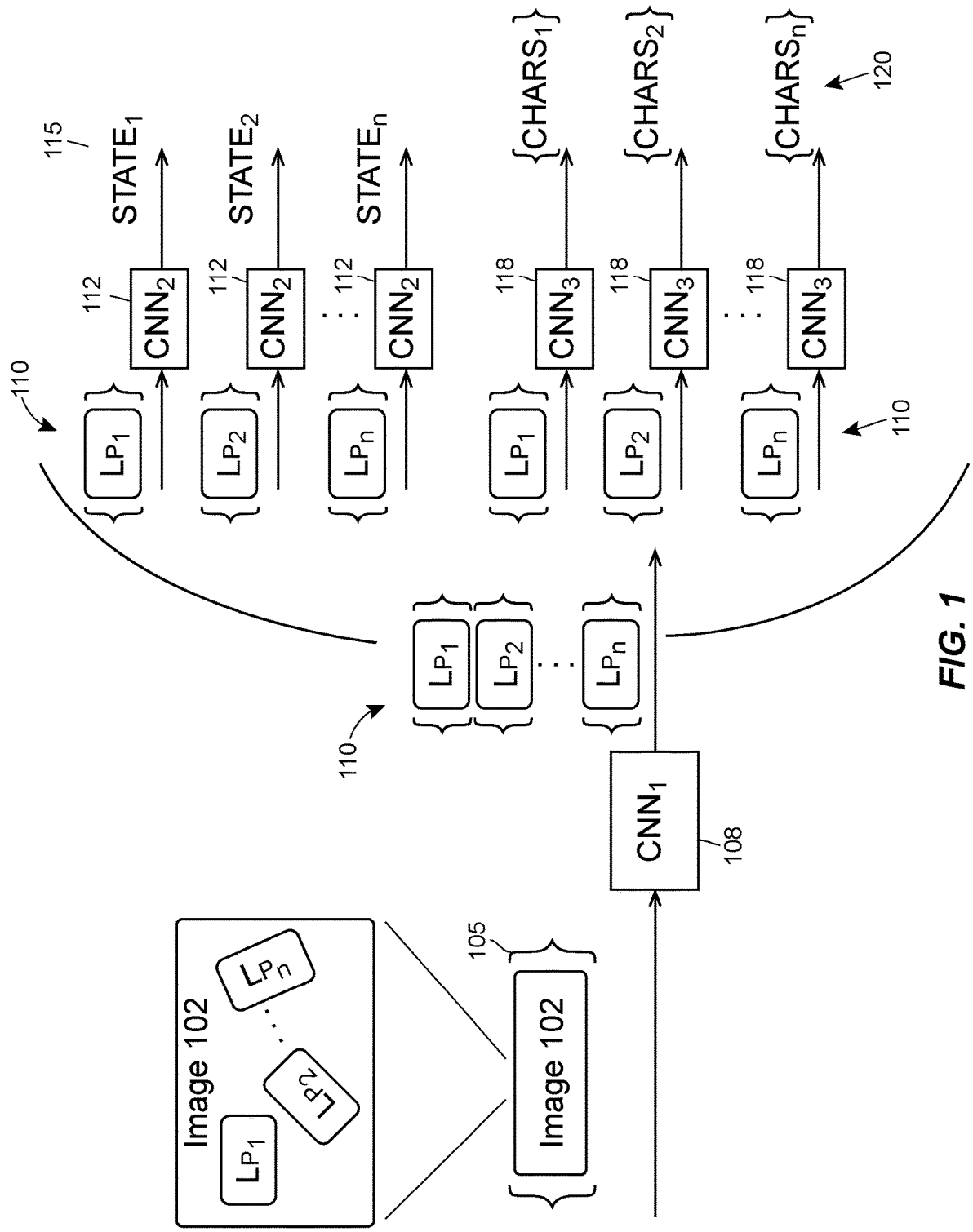
FIG. 1 depicts a block diagram of an example data flow illustrating an embodiment of detecting and decoding license plates depicted in a target image.

FIG. 1 depicts a data flow block diagram 100 illustrating an embodiment of the detecting and decoding of license plates depicted in a target image 102. As used herein, a "target image" is an image of an environment in which one or more license plates are depicted. For example, the target image 102 of FIG. 1 may include respective images of one or more license plates LP1, LP2, . . . LPn within an environment. The environment may be, for example, a road, a highway, a parking lot, an accident site, or any other environment in which license plates may be disposed. In most cases, but not necessarily, license plates are depicted as being disposed within an environment in association with respective vehicles. For example, the target image 102 may depict license plates that are attached to the outside of vehicles, that are lying on the dashboard or other location within the cabin of a vehicle and are at least partially visible through a window of the vehicle, and/or that are separated from vehicles and lying on the ground or on a shelf, hanging on the wall, etc. Generally, the content of the target image 102 consists of or is represented by a set of data points, which may be, for example, pixels, vectors, or any suitable configuration and/or implementation of data points that collectively form an image.

As depicted in FIG. 1, the data flow 100 includes applying a first convolutional neural network (CNN) 108 to the entirety of the set of data points (reference 105) that represent the content of the target image 102. For example, the entirety of the set of data points of the target image 102 may be input (reference 105) into the first CNN 108, which is interchangeably referred to herein as "$CNN_1$." As will be described in more detail in a later section, the first CNN 108 has been trained to localize images of license plates within larger images. That is, the first CNN 108 has been trained to determine respective subsets of data points that represent or depict respective license plates within a larger set of data points of which an input image consists. Significantly, the training of the first CNN 108 is performed using training data that includes identifications or labels of license plates depicted within larger images (e.g., this bounded box is a license plate, that outline bounds a license plate, this shaded area is a license plate, etc.), but the training data does not include or omits labels of key points, landmarks, and/or waypoints of various locations of individual license plates. That is, key points, landmarks, or waypoints of license plates, such as top, bottom, and side edges, corners, predefined regions, etc., are not labeled or otherwise identified within the license plate images included in the training data, and the training data includes only labels or identifications of each license plate image as a whole, and not of its parts. Moreover, if any labels of individual license plate parts, key points, waypoints, and/or landmarks are included within the training data, the training of the first CNN 108 ignores, deletes, or discards such labels. In an example implementation, the first CNN 108 may utilize Faster-R-CNN and/or other similar techniques that utilize, for example, anchors, activation maps, and/or Region Proposal Networks (RPNs). Indeed, typically the first CNN 108 may Include multiple layers that are respectively tuned with weights particular to license plate detection and localization within environment images.

As such, the first CNN 108 uses the training data to discover predictive features of license plate localization (e.g., boundaries, orientations, relationships/relativities to other depicted objects, etc.) without utilizing and/or being biased, informed by, or taught by arbitrary license plate parts labeling. Accordingly, the trained first CNN 108 utilizes only discovered features (and/or features that are learned from previously discovered features, such as when the first CNN 108 is updated or re-trained), and not per-license plate key point, landmark, way point, or part identifications, to localize depictions of license plates within images. Consequently, and advantageously, the trained first CNN 108, typically in one pass or application, is able to localize images of license plates that do not fall within the constraints of predetermined license plate key points, landmarks, parts, and/or configurations thereof, such as deformed or damaged license plates, images of license plates that were taken at large angles of skew, etc. Moreover, such advantages over prior art techniques are able to be accomplished more efficiently, as each license plate depicted within the training images need only be identified by a single, holistic label rather than by multiple labels of multiple license plate landmarks or parts, thereby significantly decreasing the time needed to label training images, and thereby eliminating the memory needed to store and administer labels of individual license plate landmarks or parts.

At any rate, $CNN_1$ (reference 108), when applied to the set of data points 105 of the target image 102, may output indications of one or more subsets 110 of the set of data points of the target image 102, where each subset of data points depicts a different license plate within the target image 102. Typically, the subsets of the data points 110 are mutually exclusive subsets, as the license plate images are mutually exclusive portions of the target image 102.

Within the data flow 100, each subset of data points 110 representing a different, respective license plate may be subject to an application of a second CNN 112 or instance thereof, which are interchangeably referred to herein as "$CNN_2$." In an embodiment, $CNN_2$ (reference 112) has been trained to determine or identify the issuing state or jurisdiction of a depicted license plate based exclusively on features that are indicative of the issuing state/jurisdiction and that have been discovered from the training data. For example, within the training data, each label of each identified license plate may simply include an indication of its issuing jurisdiction or state, for example, "California," "U.S. Virgin Islands," "British Columbia," etc. Optimally, but not necessarily, the training data includes images of special issue license plates of each jurisdiction (e.g., license plates that indicate support for veterans, wildlife, law enforcement, universities, breast cancer, peace, sports teams, and/or other special interests), and/or of different vintages or years of issuance of license plates of each jurisdiction, which may include, for example, different designs, different fonts, different color combinations, different graphics, different special issue plates, etc. Each license plate depicted within the training data (whether standard, special issue, particular vintage, etc.) may be respectively labeled as a whole with an identification of its issuing state or jurisdiction, again without labeling any parts of or landmarks of respective license plates (and by ignoring any license plate parts/landmarks labels that are perhaps inadvertently included in the training data), and without utilizing (e.g., exclusive of or excluding) any character segmentation and/or individual character recognition/decoding of state/jurisdiction names and other alphanumeric characters depicted on the license plates. By using the training data in which license plate jurisdictions are labeled or indicated holistically, $CNN_2$ (reference 112) discovers various features (e.g., discovers localizations and/or content of various features) that are more likely to be included in license plates that are issued by Illinois, e.g., the word "ILLINOIS," the words "Land of Lincoln," an image of Abraham Lincoln on the left side of the plate or in the center of the plate, an image of the Chicago skyline and the Springfield capitol dome, etc. Similarly, by using the aforementioned training data, second CNN 112 may discover that features of Maine license plates are more likely to include the word "MAINE," the word "Vacationland," the word "Lobster," an image of a lobster, an image of a bird on a pine branch with a pine cone, etc. In an example implementation, the second CNN 112 may utilize Faster-R-CNN and/or other similar techniques that utilize anchors, activation maps, and/or Region Proposal Networks (RPNs), and the second CNN 112 may include multiple layers that are respectively tuned with respective weights particular to classifications of license plates by their respective issuing states/jurisdictions to thereby discover particular features that are indicative thereof.

The discovered information or features that are indicative of particular license plate-issuing jurisdictions may be subsequently utilized by the trained second CNN 112 to classify a target image of a license plate (reference 110) to its issuing jurisdiction. Or state Indeed, the trained second CNN 112 may classify an image of a license plate (reference 110) to its issuing jurisdiction solely by using discovered jurisdictional classification features (and/or by using features that are learned based on previously discovered features, such as when the second CNN 112 is updated or re-trained), and without using utilizing (e.g., exclusive of or excluding) any character segmentation and/or individual or per-character recognition or decoding, and without using any jurisdiction-specific license plate key point, landmark, or parts labeling and/or detection. Similar to $CNN_1$, by using holistic jurisdiction-labeling to discover jurisdiction classification features for use by $CNN_2$, training data may be labeled much more quickly than known techniques, and the memory needed to store and administer labels is significantly decreased over known techniques while increasing the accuracy of the classification of license plate jurisdiction across varied designs, vintages, and less-than ideal imaging conditions (e.g., damaged license plates, blurry images, skewed images, etc.).

As shown in FIG. 1, the second CNN 112 has been applied to each subset of data points 110 corresponding to a respective, localized license plate image, and the second CNN 112 has determined that $STATE_1$ is the issuing jurisdiction of LP1, $STATE_2$ is issuing jurisdiction of LP2, and $STATE_n$ is the issuing jurisdiction of LPn, and indications of such (reference 115) may be output by the second CNN 112. It is noted that although FIG. 1 depicts different instances of the second CNN 112 operating in parallel on the different license plate images LP1, LP2, . . . LPn, this is only one of many possible implementations. In other embodiments, a single, second CNN 112 may operate on multiple license plate images sequentially or in parallel. Indeed, any number of second CNNs 112 may operate on any number of license plate images, either sequentially and/or in parallel, as desired. The resulting output(s) 115 of the second CNN 112 may identify the issuing state or jurisdiction of a depicted license plate, and an indication of the issuing state or jurisdiction 115 may be provided to a user interface, to another CNN (not shown), and/or to one or more other computing devices.

With further reference to FIG. 1, each subset of data points 110 that depict a license plate may be subject to an application of a third CNN 118 or instance thereof, which are interchangeably referred to herein as "$CNN_3$." In an embodiment, $CNN_3$ (reference 118) has been trained to localize and classify images of ordered sets of license plate characters within images of license plates. That is, given an image of a license plate represented by a set of data points (e.g., the groups of data points 110), the third CNN 118 is trained to determine, e.g., to localize and decode, a respective subset of data points that represent or depict an ordered set of characters (typically alphanumeric, but may include script, logograms, other units of written language, etc., depending on the language) that are embossed, printed, or otherwise represented on the license plate. Said another way, the third CNN 118 is trained to detect and decode the set of characters that has been assigned to a depicted license plate by its issuing jurisdiction and that is presented on the license plate image. In an embodiment, the training data utilized to train $CNN_1$ and $CNN_2$ may be utilized to train the $CNN_3$. As such, the training data does not include labels of key points, landmarks, and/or waypoints of parts and/or portions of individual license plates (and/or, any such license plate part or landmark labels are omitted, deleted, or ignored for training purposes). However, each license plate depicted within the training data typically is labeled as a whole with the respective, ordered set of characters depicted thereon, e.g., "NLP 456", "SC 2424", "GOHAWKS", etc., and such labels may be the only labels that are utilized to train $CNN_3$ to discover features that are indicative of localizing and decoding ordered sets of license plate characters as a whole, without utilizing individual or per-character detection or splitting techniques. In an example implementation, the third CNN 118 may utilize Faster-R-CNN and/or other similar techniques that utilize anchors, activation maps, and/or Region Proposal Networks (RPNs), and the third CNN 118 may include multiple layers that are respectively tuned with respective weights particular to license plate character localization and decoding within images of license plates.

Consequently, the third CNN 118 is able to use the training data to discover predictive features of the localization of assigned license plate characters (e.g., boundaries, orientations, relations to other pictorial and/or alphanumeric features of the license plate, etc.) and decoding as a whole without utilizing and/or being biased, taught, or otherwise informed by arbitrary license plate parts and/or individual character labeling. Accordingly, for a given license plate image, the trained third CNN 118 is able to localize and decode the ordered set of license plate characters that are represented on the given license plate image as a whole in its entirety, by exclusively using features that were discovered during training (and/or features that were learned from previously discovered features, such as when the third CNN 118 is re-trained or updated), and without using any individual character segmentation and/or individual character recognition/decoding techniques (e.g., exclusive of or excluding any character segmentation and/or individual or per-character recognition/decoding techniques). As such, the trained third CNN 118 is able to localize, identify, and decode sets of assigned license plate characters even when some characters are partially occluded within a target image, when one of the characters is damaged or deformed, and in other types of images in which individual or per-character recognition/decoding techniques are likely to give erroneous, indeterminate, or no results. Moreover, such advantages over prior art techniques are able to be accomplished more efficiently, as each license plate depicted within the training images need only be identified by a holistic label rather than by multiple labels of multiple parts, thereby significantly decreasing the time needed to label training images and eliminating the memory needed to store and administer labels of individual license plate parts.

As shown in FIG. 1, the third CNN 118, after its application to the image of the license plate LP1, has determined that the ordered set of characters represented on LP1 is the set $CHARS_1$. In a similar manner, the third CNN 118 has determined that the ordered set of characters represented on LP2 is the set $CHARS_2$, and the ordered set of characters represented on LPn is the set CHARSn. Additionally, as shown in FIG. 1, different instances of the third CNN 118 are operating in parallel on the different license plate images LP1, LP2, . . . LPn that have been localized by the first CNN 108 from the target image 102; however, this is only one of many implementations. In another embodiment, a single, third CNN 118 may operate on multiple license plate images sequentially or in parallel to localize and decode characters represented thereon. Indeed, any number of third CNNs 118 may operate on any number of license plate images, either sequentially and/or in parallel, as desired. The resulting output 120 of the third CNN 118 may include an indication of the ordered set of characters presented on the depicted license plate, and may be provided to a user interface, to another CNN, and/or to one or more other computing devices.

Further, although FIG. 1 depicts instances of the second CNN 112 and the third CNN 118 as being separate and distinct, this depiction is for clarity of discussion, and is only one of many possible embodiments. For example, in another embodiment (not shown), the second CNN 112 and the third CNN 118 may be an integral CNN that receives, as its input, a set of data points 110 corresponding to respective, localized license plate image. The integral CNN may, with a single application to the input data points 110, determine both the issuing jurisdiction of the depicted license plate and the ordered set of characters depicted thereon, and may output respective indications thereof 115, 120 to user interfaces, other CNNs, and/or other computing devices. In another example, the third CNN 118 may be trained on a jurisdiction-specific basis, and accordingly, the third CNN 118 may receive as its inputs an indication of the issuing jurisdiction of the license plate 115 output by the second CNN 112 and the set of data points 110 corresponding to the respective, localized license plate image to thereby decode the set of characters assigned to and presented on the depicted license plate. Of course, other embodiments of different instances and functionalities of the CNNs 108, 112, and 118 may be implemented to thereby customize and tailor the processing of the data flow 100 as desired.

Figure 2:
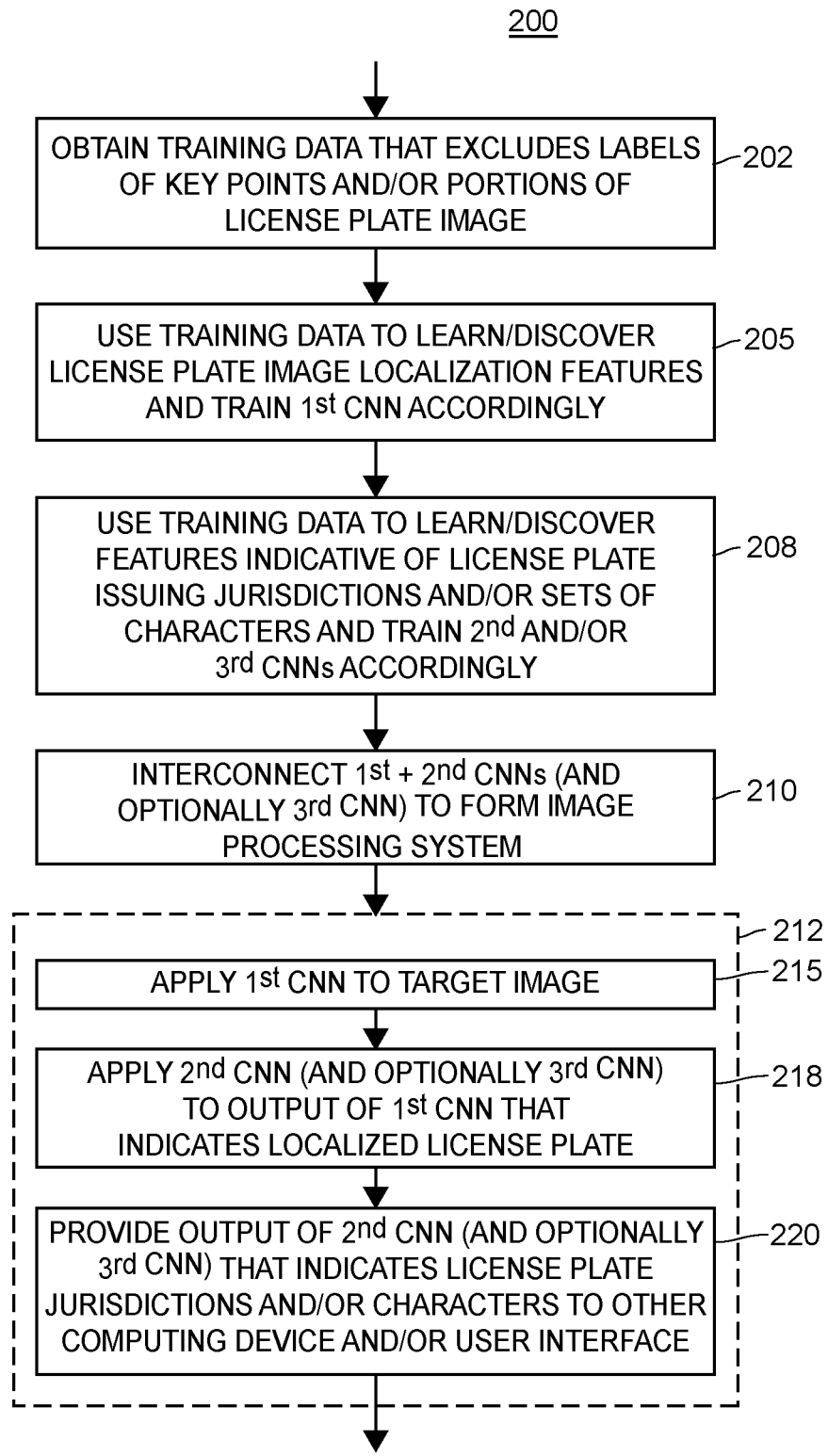
FIG. 2 depicts an flow chart of an example method of detecting and decoding license plates depicted within images.

FIG. 2 depicts a flow chart of an embodiment of an example method 200 of detecting and decoding license plates depicted within images. At least a portion of the method 200 may be performed by an image processing system, such as embodiments of the image processing systems described elsewhere herein. In some implementations, the method 200 may result in at least a portion of the example data flow 100 depicted in FIG. 1. Further, in embodiments, the method 200 may include additional, less, or alternate functionality than that discussed with respect to FIG. 2, including that discussed elsewhere herein.

At a block 202, the method 200 includes obtaining training data that is to be utilized to train one or more convolutional neural networks (CNNs). The training data includes a plurality of images of environments in which license plates are depicted, and includes labels that indicate or describe each depicted license plate as a whole, including its issuing jurisdiction and the ordered set of characters that was assigned to the license plate and represented (e.g., embossed, printed, engraved, or otherwise represented) thereon, e.g., "South Carolina LZD 925," "Alberta BGF-7627," "Illinois BLKHWKS," etc. Significantly, though, the training data excludes, omits, deletes, and/or otherwise does not contain labels of key points, landmarks, and/or portions of individual, depicted license plates. If, for some reason, the training data does include some license plate key point, landmark, and/or portion labels or identifiers, such license plate parts/portions labels and identifiers are ignored by the method 200. Further, the training data excludes, omits, and otherwise does not contain any individual character segmentation and/or individual or per-character recognition indications. If, for some reason, the training data does include some character segmentation and/or individual or per-character recognition identifications, such identifications are ignored by the method 200.

Optimally, but not necessarily, the training data includes a variety of images of environments in which license plates are disposed, where the images were captured from a variety of different angles with respect to a respective image capture device, e.g., from a variety of skew angles and/or slant angles of capture. For example, the training data may (and preferably, but not necessarily) include images taken by image capture devices disposed between 0°-180° in any direction from the faces of license plates whose images they captured. Additionally, the training data may include images of license plates that were captured in a variety of different conditions, e.g., license plates that were at least partially occluded within an environment image, that had one or more broken, distorted, or damaged characters, that were captured in different lighting conditions, that had different resolutions or qualities of focus. That is, the plurality of images that are utilized as training data need not have been filtered or otherwise selected for use in training based on angle of capture, degree of occlusion, broken and/or damaged characters, lighting conditions, shadowing, image resolutions, and/or other criteria. Ideally, but not necessarily, the training data includes images of license plates from a plurality of states or issuing jurisdictions and across different vintages or ranges of years of plate issuance of each jurisdiction, as well as images of different license plate designs (e.g., special issue license plates, design changes and/or options, etc.) of each jurisdiction.

At a block 205, the method 200 includes using the training data to train a first convolutional neural network (CNN) to discover or learn one or more features within the training images that depict license plates, where the discovered features correspond to localizing or determining particular portions or areas that depict license plates within the training images. The training images may be two-dimensional and/or three-dimensional images, and the content of the training images may be formed by a set of data points such as, for example, pixels, vectors, or any other suitable format of imaging data points. Significantly, the training data may include images of license plates that are labeled or otherwise identified as a whole as being an image of a license plate (e.g., via bounding boxes, outlines, shading, or any other type of suitable indicator(s)), and such holistic labels may be utilized to train the first CNN 205. (During training, though, any labeling of key points, landmarks, waypoints, areas, or portions within the individual depicted license plates of the training data are excluded, omitted, or ignored.) As such, the training of the first CNN 205 is not biased, taught, or otherwise informed by the labeling of key points, way points, areas, and/or portions of individual license plates, and is based exclusively on discovered or learned information pertaining to license plate images as a whole. Consequently, during training, the first CNN may thus discover one or more particular features within images that are predictive of a subset of data points, within a larger image, as being a depiction of an image of a license plate, and the discovered features may or may not include any key points, landmarks, waypoints, areas, or portions of license plates. Using only the discovered features, upon application to a target image, the first CNN may detect or identify a particular portion of or area within the target image as depicting a license plate based on the features and/or characteristics that it has discovered from the training data, even if the target image is distorted, taken from a severe skew angle, taking in low light, partially occluded, etc. That is, within an image that is made up of a set of data points (e.g., pixels, vectors, etc.), the first CNN may identify a particular subset of data points therein that depict a license plate based (e.g., solely) upon the features discovered during training, and optionally based upon other features that are subsequently learned based on the discovered features. Accordingly, for an environment image that is provided as an input to which the first CNN, the output of the first CNN is an indication of a particular subset of data points (e.g., a particular subset of the entirety of data points that make up the given image) that depict a license plate within the given image.

At a block 208, the method 200 includes using the training data to train a second convolutional neural network (CNN) to discover one or more features of license plates that are indicative of an issuing state or other issuing jurisdiction of the license plate and/or of a set of characters that were assigned by the issuing jurisdiction and presented on the license plate. For example, the depicted license plates within the training data that are labeled or otherwise identified as a whole may also be labeled, as a whole, with a corresponding state or jurisdiction and corresponding set of assigned characters. Such holistic labels may be used to train the second CNN 208, while any labeling of key points, landmarks, or waypoints within particular license plates and any labeling of individual characters presented on the license plate are excluded, omitted, and/or ignored during training. The second CNN may discover therefrom one or more particular features of images that are predictive of the issuing state or jurisdiction of a depicted license plate (which may or may not correspond to traditional key points/landmarks/way points, e.g., top, right edge, bottom edge, corners, etc. which, at any rate, were not labeled in the training data, or whose labels in the training data were ignored). Additionally or alternatively, the second CNN may discover, from the training data, one or features of images that are indicative of localizing or otherwise determining a particular area, within the license plate image, that depicts the set of characters of the depicted license plate, and/or may discover one or more features of the localized areas in which license plate characters are depicted that are predictive of the particular characters and their ordering as a whole on the depicted license plate area. That is, the one or more features discovered by the second CNN may allow the second CNN to classify and decode ordered sets of license plate characters in their respective entireties, rather than character by character.

Significantly, the second CNN may discover the one or more features that are indicative of an issuing jurisdiction, a localization of the assigned set of characters within a license plate image, and/or the content and order of the assigned set of characters presented on a depicted license plate without utilizing any individual character segmentation and without using any individual or per-character recognition techniques. As such, the second CNN is trained to identify states/jurisdictions and/or sets of characters of depicted license plates as a whole across a wide variety of types of images, including less-than-ideal images in which one or more license plate characters are damaged or occluded, the image is of low resolution, environmental lighting conditions are poor, numerous shadows are present, etc., and/or across images that have been captured from a wide variety of different angles of capture between the face of the license plate and the image capture devices, e.g., from a variety of different skew angles and/or slant angles.

In some embodiments, the training of the second CNN 208 may include training two different CNNs, one of which is trained 208 using the training data to determine an issuing jurisdiction or state of a depicted license plate, and the other of which is trained 208 using the training data to localize and decode the ordered set of characters represented on the depicted license plate. For example, training the second CNN 208 may include training both the CNN 112 and the CNN 115 of FIG. 1.

At a block 210, the method 200 includes interconnecting the first CNN and the second CNN (and, in some embodiments, a third CNN, such as when classification by jurisdiction and decoding of characters are performed by different CNNs), thereby forming an image processing system that localizes depictions of license plates within larger images, classifies depicted license plate images according to their issuing state or jurisdiction, and localizes and decodes ordered sets of characters represented on the depicted license plates. In an embodiment, the output of the first CNN is provided to the input of the second CNN. In an embodiment, various outputs of the first CNN are provided to respective, different instances of the second CNN. As such, an image processing system may include one or more instances of the first CNN whose respective outputs are provided to respective inputs of one or more instances of the second CNN. As such, the one or more first CNNs may operate, within the image processing system, sequentially and/or in parallel, as desired. Similarly, the one or more second CNNs may operate, within the image processing system, sequentially and/or in parallel, as desired. In some embodiments, the output of the first CNN is provided to both instances of the second CNN and instances of the third CNN, in a manner such as previously discussed with respect to FIG. 1. Of course, numerous combinations of different instances and functionalities of the CNNs of the image processing system may be implemented to thereby customize and tailor the method 200, as desired.

At a block 212, the method 200 includes utilizing the image processing system, including the trained first and second CNNs, to determine the issuing states (or issuing jurisdictions) and/or sets of assigned characters of license plates that are included in target images. As shown in FIG. 2, the block 212 includes applying the first CNN to a target image (block 215), e.g., to the entirety of a set of data points of which the content of the target image consists. The target image may be a two-dimensional image or a three-dimensional image, for example, whose content is represented by the set of data points. Generally speaking, the application of the first CNN to the target image (block 215) localizes the depiction of a license plate within the target image. That is, the application of the first CNN to the target image determines the subset of data points, from the entirety of the set of data points of the target image, that depict the license plate within the target image. Indeed, the application of the first CNN to the target image (block 215) may result in an output of an indication of one or more mutually exclusive subsets of data points from the target image, where each subset of data points depicts or represents a different, particular license plate depicted within the target image. In an embodiment, the indication of a depicted license plate that is output by the first CNN may be a crop of an area of the target image in which the license plate is depicted, but other suitable formats of indications of license plate images may be utilized, if desired. Generally speaking, the application of the first CNN to the target image (block 215) localizes the depiction of the license plate within the target image, and provides an indication of the localization, e.g., at an output of the first CNN.

The indication of the subset of data points depicting or representing a license plate that is depicted within the target image, e.g., the output of the first CNN, may be provided to the second CNN, and the second CNN may be applied to the indicated subset of data points depicting the license plate (block 218). For example, the second CNN may be applied (block 218) to each subset of data points of the target image that was determined by the first CNN to be a respective license plate depicted within the target image, either sequentially or in parallel. In an embodiment, a single application of the second CNN to the subset of data points of the depicted license plate may utilize only the features learned by the second CNN to determine or identify the issuing jurisdiction of the depicted license plate; localize or otherwise determine a particular area within the license plate image that depicts the set of characters represented on the depicted license plate; and decode or classify, e.g., as a whole, the entirety of the ordered set of assigned characters depicted within the particular area of the depicted license plate. The application of the second CNN to the target image (block 218) may result in an output of an indication of the issuing state (or the issuing jurisdiction) of the depicted license plate and/or the ordered set of characters represented thereon, e.g., at an output of the second CNN. Typically, but not necessarily, the set of characters of the depicted license plate includes one or more alphanumeric characters, but may additionally or alternatively include script, logograms, other units of written language, etc.

At a block 220, the indication of the state/issuing jurisdiction and/or the set of characters of the detected license plate may be provided to a user interface, to another CNN, and/or to another computing device, e.g., via a wired and/or wireless connection.

Figure 3:
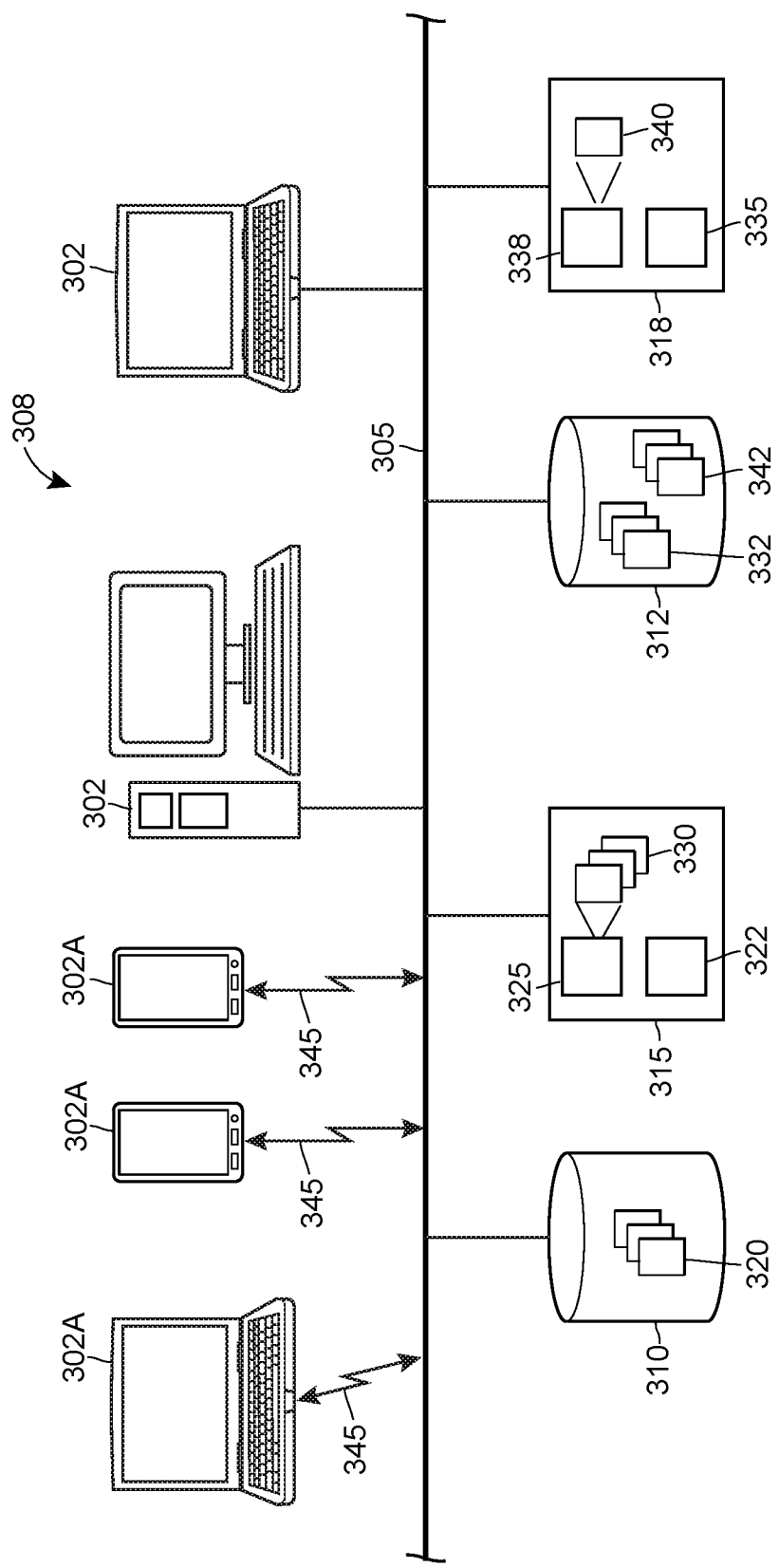
FIG. 3 depicts a block diagram of an example image processing system that detects images of license plates within other images, and determines respective issuing jurisdictions of the detected license plates, and/or the respective sets of assigned characters presented on the detected license plates.

Now turning to FIG. 3, FIG. 3 depicts a block diagram of an example image processing system 300 that detects images of license plates within other images, the respective issuing states or jurisdictions of the detected license plates, and/or the respective sets of assigned characters represented (e.g., embossed, printed, engraved, or otherwise represented) on the depicted license plates. The image processing system 300 may implement at least a portion the data flow diagram 100 of FIG. 1, for example. Additionally or alternatively, the image processing system 300 may perform at least a portion of the method 200 described in FIG. 2. Of course, the system 300 may implement other data flows and/or other methods for detecting and decoding images of license plates, if desired.

As illustrated in FIG. 3, the image processing system 300 may include various user interface devices 302, which may be general purpose computers, handheld or portable devices, cell phones or smart devices, workstations, tablets, laptops, drones, remotely situated (and optionally, remotely controlled) cameras or imaging devices, drones, etc., connected through one or more wired and/or wireless communication networks 305, to one or more further computing devices 308 which may operate as servers and/or data storage devices in a traditional client-server or cloud-based network. For example, the further computing devices or servers 308 may include one or more databases 310 and 312, and one or more servers 315 and 318 having computer processing and storage capabilities.

In this example system 300, the database 310 may store a plurality of training images 320 (which may be, for example, two dimensional and/or three dimensional images) that generally are images of environments in which license plates are located and depicted. As previously discussed, each depiction of a license plate within the training images 320 may be labeled or indicated as a whole as being a license plate issued by a particular jurisdiction and including a particular, assigned set of characters (which may be alphanumeric characters, but may additionally or alternatively include script, logograms, other units of written language, etc., depending on the language), e.g., "Minnesota 70424MG," "Hawaii 107 TJA," "Oklahoma 838 38C," etc. Significantly, the training images 320 need not (and typically, for the most part, do not) include any labeling or identification of parts or landmarks of individual license plates, such as indications of edges, corners, center lines, or other portions of individual license plates. Further, individual characters represented on the license plate are not individually segmented and identified. If, however, such part- or landmark-based labeling and/or individual character identification of any individual license plates is included in the training images 320, such labeling or identifiers are removed prior to training, or are otherwise ignored during training.

The training images 320 may optimally (but not necessarily) include images of license plates in and of a variety of conditions, such as images in which the lighting level of the environment is low or below a lighting threshold; images in which at least some of the license plate depictions are partially occluded or deeply shadowed; images of license plates that are dented, folded, crumpled, broken, or otherwise damaged or distorted; images of license plates having one or more characters that are damaged, defaced, or missing, and the like. Further, the training images 320 may include images of differing image qualities, e.g., images in which the resolution is below a resolution threshold, images whose contrast is below a contrast threshold, images that are blurry, images with significant shadowing, etc. Additionally or alternatively, the training images 320 may include images of license plates that have been captured across a variety of skew angles, slant angles, and distances with respect to a respective image capture device. Still further, the training images may include images of license plates from a variety of jurisdictions, and of a variety of vintages, designs, and styles for a particular jurisdiction.

The server 315, which may include one or more processors 322 and one or more tangible, non-transitory computer readable memories 325, may store one or more image processing training routines 330. The training routines 330 may be implemented on the processor(s) 322 and may operate on the training images 320 to determine a set of convolutional neural networks (CNNs) 332 corresponding to detecting and decoding license plate images. The CNNs 332 are illustrated in FIG. 3 as being stored in the database 312, however, these components 332 could be stored in other memories associated with and/or accessible by the image processing system 300 if desired.

In an embodiment, one or more training routines 330 may utilize the training data 320 to discover, determine, and/or learn one or more features or characteristics that are indicative of localizing license plate images within larger images (e.g., boundaries, orientations, relationship to other depicted objects, etc.), and may produce and/or select a first CNN 332 that will be used by the image processing system 300 to localize images of license plate within target images. Similarly, one or more training routines 330 may utilize the training data 320 to discover, determine, and/or learn one or more features or characteristics that are indicative of a jurisdictional classification (e.g., an issuing jurisdiction or issuing state) of a license plate, and may produce and/or select a second CNN 332 that will be used by the image processing system 300 to classify images of license plates to their issuing jurisdiction. Still similarly, one or more training routines 330 may utilize the training data 320 to discover, determine, and/or learn one or more features or characteristics that are indicative of localizing images of assigned license plate characters within images of license plates, and are indicative of a decoding of a localized image of license plate characters as a whole. Accordingly, the one or more training routines 330 may produce and/or select a third CNN 332 that will be used by the image processing system 300 to localize a set of license plate characters within a license plate image and decode the set of characters as a whole.

Thus, generally speaking, the image training routines 330 use the training images 320 to produce and/or select the CNNs 332, in one example, that will be used by the image processing system 300 to detect images of license plates within target images, and to identify the issuing states or jurisdictions of detected license plate images and/or to identify the ordered set of issued characters assigned to and represented on detected license plate images. In one example, the image training routines 330 may calculate or determine a set of CNNs 332 based on the training set of data 320, and the CNNs 332 may be stored and then later used to detect and decode license plates depicted within target images.

In an example implementation, each CNN 332 may be formed and/or trained by using Faster-R-CNN and other similar techniques that utilize anchors, activation maps, and/or Region Proposal Networks (RPNs) as applied to the training images 320. Typically, each CNN may include multiple layers that are respectively tuned with weights particular to the particular localization, classification, and/or decoding functionality of the particular CNN.

Moreover, as illustrated in FIG. 3, the server 318, may include one or more processors 335 and one or more tangible, non-transitory computer readable memories 338 that store an image processing routine 340 that may perform image processing on a set of target images 342 that depict environments in which license plates are disposed, e.g., on or in vehicles, on a shelf or wall, on the ground, etc. The images 342 may include two-dimensional and/or three-dimensional images, and may be stored in the database 312, for example, or in any one or more databases included in or accessible to the system 300, including databases disposed on user interface devices 102. Generally speaking, the image processing routine 340 may use the CNNs 332 (as stored in the database or memory 312) as well as the set of target images 342 to detect and decode any license plates depicted therein.

During operation, a user may log onto or access the system 300 via one of the user interfaces 302, 302A, may upload or store a new set of environment images 342 into the database 312, and may additionally provide or store information in the database 312 related to the new set of images 342, such as a geo-spatial or other indicators of the environment locations, time and date of capture of the images, etc. Additionally or alternatively, at least of the environment images 342 may be captured and streamed or otherwise automatically delivered to the system 300 via a camera or remote imaging device, such as from a surveillance video camera or drone, which may be automatically operated, or may be remotely operated by a user. Generally speaking, the new set of target images 342, along with information related to the new set of target images 342, may be provided to the database 312 via the communication network(s) 305, and may be stored in the database 312. The user, the remote imaging device, or another requesting device may then initiate the image processing routine 340 to operate on the new set of target images 342 to detect and decode any license plates depicted therein.

Once initiated, the image processing routine 340 will operate to detect the depiction of license plates within the target images 342. Generally speaking, the image processing routine 340 will use the CNNs 332 to detect the presence of license plate images within the target images, and for each detected license plate, determine its respective issuing jurisdiction and/or set of assigned characters represented thereon. The image processing routine 340 may then may provide this detected and decoded information to the user via one of the user interfaces 302, 302A in any of various different manners, and/or to other computing devices and systems, e.g., via the communication networks 305. Optionally, other information associated with detected and decoded license plates may be provided, such as an indication of the particular image in which the license plate was detected, a time of capture, etc.

While it will be understood that the image processing system 300 of FIG. 3 is illustrated as a hardwired system having various servers and databases 308 connected to various user interfaces 302 via a wired communication network 305, other processing and communication configurations could be used as well or instead. For example, the network 305 could be a wireless communication network, or could be a combined wired and wireless communication network, and the network 305 may include any type of communication network, including a public local area network (LAN) or wide area network (WAN), a private LAN or WAN, a set of direct communication connections, etc.

Moreover, the network 305 may include or use the Internet or the World Wide Web, to enable users at the user interfaces 302 and 302A to communicate with the servers and databases 308 via an Internet connection to upload photos or images of various environments 342 to the database 312, to initiate the image processing routines 330 or 340, to view the results of the routine 340, etc. Still further, while the servers and databases 308 are illustrated in FIG. 3 as including five different devices that have different information stored therein, any number of servers, databases, and/or other computing devices could be used and, in fact, the elements illustrated in the servers and databases 308 of FIG. 3 could be stored within or distributed among more or less than the illustrated devices. For example, these components could be all stored in the same computer processing device, which could be the same computer processing device as one of the user interfaces 302 or 302A. In another example, at least some (or all) of these components could be implemented using a computing cloud architecture. Thus, the architecture of the image processing system 300 of FIG. 3 could be changed to include more or less computer devices connected in various different manners and still function as described herein. Further, in embodiments, the system 300 may include additional, less, or alternate functionality than that discussed with respect to FIG. 3, including that discussed elsewhere herein.

Although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims and all equivalents thereof. By way of example, and not limitation, the disclosure herein contemplates at least the following aspects:

1. A method of detecting and decoding license plates depicted within images, the method comprising: applying, to an image of an environment, the environment image being a set of data points, a first convolutional neural network (CNN) trained to detect depictions of license plates within images, thereby detecting and identifying a subset of the data points that depicts a license plate of a vehicle within the environment image, an indication of the subset of data points depicting the license plate being an output of the first CNN; applying, to the subset of data points indicated by the output of the first CNN, a second CNN trained to determine, exclusive of or without using character segmentation, at least one of respective issuing jurisdictions or respective sets of characters assigned to and presented on license plates, thereby identifying at least one of an issuing jurisdiction or a set of characters of the detected license plate, an indication of the at least one of the issuing jurisdiction or the set of characters of the detected license plate being an output of the second CNN; and transmitting the output of the second CNN or another indication of the identified at least one of the issuing jurisdiction or the set of characters of the detected license plate to at least one of a computing device or a user interface.

2. The method of the previous aspect, wherein identifying the at least one of the issuing jurisdiction or the set of characters of the detected license plate comprises identifying the issuing jurisdiction and the set of characters of the detected license plate.

3. The method of any one of the previous aspects, wherein identifying the at least one of the issuing jurisdiction or the set of characters of the detected license plate consists of identifying the at least the one of the issuing jurisdiction or the set of characters exclusive of character segmentation or individual or per-character recognition or decoding.

4. The method of any one of the previous aspects, wherein identifying the at least one of the issuing jurisdiction or the set of characters of the detected license plate consists of identifying the at least the one of the issuing jurisdiction or the set of characters exclusive of key point identification of the detected license plate.

5. The method of any one of the previous aspects, wherein identifying the at least one of the issuing jurisdiction or the set of characters of the detected license plate comprises localizing and decoding an entirety of the set of characters of the detected license plate via a single application of the second CNN to the subset of data points depicting the detected license plate.

6. The method of any one of the previous aspects, wherein identifying the at least one of the issuing jurisdiction or the set of characters of the detected license plate comprises localizing and decoding the entirety of the set of characters of the detected license plate and classifying the issuing jurisdiction of the detected license plate via the single application of the second CNN to the subset of data points depicting the detected license plate.

7. The method of any one of the previous aspects, wherein the indication of the subset of data points comprises a crop of the environment image, the cropped environment image depicting the detected license plate.

8. The method of any one of the previous aspects, wherein the set of characters of the detected license plate includes one or more alphanumeric characters.

9. The method of any one of the previous aspects, further comprising training at least one of the first CNN or the second CNN by utilizing training data comprising a plurality of images depicting license plates disposed in a plurality of environments, wherein the training data excludes any labels or any identifications of key points and/or landmarks of license plate images.

10. The method of the previous aspect, wherein at least one of: training the first CNN comprises training the first CNN exclusively by discovering features included in the training data that correspond to localizing images of license plates within images of environments; or training the second CNN comprises training the second CNN exclusively by discovering features included in the training data that are indicative of issuing jurisdictions and/or sets of characters assigned to and presented on license plates by issuing jurisdictions, the discovering of the features excluding individual character segmentation and/or key point and/or landmark identification of license plates depicted in the training data.

11. The method of any one of aspects 9-10, wherein the plurality of images included in the training data includes a plurality of images captured by different devices located at different distances from respective license plates and at different angles of capture with respect to the respective license plates.

12. The method of any one of aspects 9-11, wherein the plurality of images utilized for training data include images in which respective license plates: are at least partially occluded; have one or more broken or damaged characters; respectively correspond to different jurisdictions; are disposed in a respective environment having a level of light below a lighting threshold; and/or are depicted with a respective resolution below a resolution threshold.

13. An image processing system that detects and decodes license plates depicted within images, the image processing system comprising: one or more processors; one or more tangible, non-transitory computer-readable storage media storing a first convolutional neural network (CNN) trained to detect depictions of license plates within images and storing a second CNN trained to identify at least one of respective issuing jurisdictions or respective sets of characters assigned to and presented on license plates; and computer-executable instructions stored on the one or more tangible, non-transitory computer-readable storage media that, when executed by the one or more processors, cause the image processing system to:

apply the first CNN to a set of data points of an image of an environment to thereby detect and identify a subset of the set of data points that depicts a license plate of a vehicle within the environment image, an indication of the subset of data points depicting the license plate being an output of the first CNN; apply the second CNN to the subset of data points indicated by the output of the first CNN to thereby identify, exclusive of character segmentation, at least one of an issuing jurisdiction or a set of characters of the license plate, an indication of the at least one of the issuing jurisdiction or the set of characters of the license plate being an output of the second CNN; and transmit the output of the second CNN or another indication of the identified at least one of the issuing jurisdiction or the set of characters of the license plate to at least one of a computing device or a user interface.

14. The image processing system of the previous aspect, wherein the application of the second CNN to the subset of data points depicting the license plate of the vehicle within the environment image identifies both the issuing jurisdiction and the set of characters of the license plate.

15. The image processing system of any one of aspects 13-14, wherein the application of the second CNN to the subset of data points depicting license plate of the vehicle to thereby identify the at least one of the issuing jurisdiction or the set of characters of license plate is a lone application of the second CNN to the subset of data points depicting the license plate.

16. The image processing system of the previous aspect, wherein the lone application of the second CNN to the subset of data points depicting the license plate identifies both the set of characters and the issuing jurisdiction of the license plate.

17. The image processing system of any one of the aspects 13-16, wherein the detection and identification of the at least one of the issuing jurisdiction or the set of characters of the license plate is performed by the second CNN exclusive of at least one of any character segmentation or any individual or per-character recognition or decoding.

18. The image processing system of any one of the aspects 13-17, wherein the detection and identification of the at least one of the issuing jurisdiction or the set of characters of the license plate is performed by the second CNN exclusive of any key point and/or landmark identification of the license plate.

19. The image processing system of any one of aspects 13-18, wherein the indication of the subset of data points depicting license plate comprises a crop of the environment image, the cropped environment image depicting the license plate.

20. The image processing system of any one of aspects 13-19, wherein the set of characters of the license plate includes one or more alphanumeric characters.

21. The image processing system of any one of aspects 13-20, wherein at least one of the first CNN or the second CNN is trained using training data that excludes any labeling of any key points and/or landmarks of license plates depicted within the training data.

22. The image processing system of the previous aspect, wherein at least one of: the first CNN is trained exclusively by discovering features included in the training data that correspond to localizing images of license plates within images of environments; or the second CNN is trained exclusively by discovering features included in the training data that are indicative of issuing jurisdictions and/or sets of characters assigned to and presented on license plates by issuing jurisdictions, the learning of features excluding character segmentation, individual or per-character recognition or decoding, and/or key point and/or landmark identification of license plates depicted within the training data.

23. The image processing system of any one of aspects 21-22, wherein the training data includes a plurality of images depicting license plates disposed in a plurality of environments, the plurality of images captured by different devices located at different distances from respective license plates and/or at different angles of capture with respect to the respective license plate.

24. The image processing system any one of aspects 21-23, wherein the training data includes images in which respective license plates: are at least partially occluded; have one or more broken or damaged characters; respectively correspond to different jurisdictions; are disposed in a respective environment having a level of light below a lighting threshold; and/or are depicted with a respective resolution below a resolution threshold.

25. The method of any one of aspects 1-12 performed by the image processing system of any one of aspects 13-24.

26. Any one of the previous aspects in combination with any other one of the previous aspects.

The following additional considerations apply to the foregoing discussion. Throughout this specification, plural instances may implement components, operations, or structures described as a single instance. Although individual operations of one or more routines or methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms or units. Any of these modules, units, components, etc. may constitute either software modules (e.g., code stored on a non-transitory machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

A hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the hardware terms used herein should be understood to encompass tangible entities, be that entities that are physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules or routines can provide information to, and receive information from, other hardware and/or software modules and routines. Accordingly, the described hardware modules may be regarded as being communicatively coupled. Where multiple of such hardware or software modules exist contemporaneously, communications may be achieved through signal transmission (e.g., over appropriate circuits, lines and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a plant environment, an office environment or as a server farm), while in other embodiments the processors may be distributed across a number of locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "application," an "algorithm" or a "routine" is a self-consistent sequence of operations or similar processing leading to a desired result. In this context, applications, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs may be used for implementing an image processing application and system for configuring and executing the change detection techniques disclosed herein. Thus, while particular embodiments and applications have been illustrated and described herein, it is to be understood that the disclosed embodiments are not limited to the precise construction and components disclosed herein. Various modifications, changes and variations, which will be apparent to those skilled in the art, may be made in the arrangement, operation and details of the methods and structure disclosed herein without departing from the spirit and scope defined in the claims.

What is claimed:

1. A method of detecting and decoding vehicle license plates depicted within images, the method comprising:
    applying, to an image of an environment, the environment image being a set of data points, a first convolutional neural network (CNN) trained to detect depictions of license plates within images, thereby identifying a subset of the data points of the environment image that depicts a license plate of a vehicle within the environment image, an indication of the subset of data points depicting the license plate being an output of the first CNN;
    applying, to the subset of data points indicated by the output of the first CNN, a second CNN trained to determine, exclusive of character segmentation, at least one of respective issuing jurisdictions of license plates or respective sets of characters assigned to and presented on license plates, thereby identifying at least one of an issuing jurisdiction or a set of characters of the detected license plate, an indication of the at least one of the issuing jurisdiction or the set of characters of the detected license plate being an output of the second CNN; and
    transmitting the output of the second CNN or another indication of the identified at least one of the issuing jurisdiction or the set of characters of the detected license plate to at least one of a computing device or a user interface.

2. The method of claim 1, wherein identifying the at least one of the issuing jurisdiction or the set of characters of the detected license plate comprises identifying the issuing jurisdiction and the set of characters of the detected license plate.

3. The method of claim 1, wherein identifying the at least one of the issuing jurisdiction or the set of characters of the detected license plate comprises localizing and decoding an entirety of the set of characters of the detected license plate as a whole via a single application of the second CNN to the subset of data points depicting the detected license plate.

4. The method of claim 3, wherein identifying the at least one of the issuing jurisdiction or the set of characters of the detected license plate comprises localizing and decoding the entirety of the set of characters of the detected license plate as a whole and classifying the issuing jurisdiction of the detected license plate via the single application of the second CNN to the subset of data points depicting the detected license plate.

5. The method of claim 1, wherein the indication of the subset of data points comprises a crop of the environment image, the cropped environment image depicting the detected license plate.

6. The method of claim 1, wherein the set of characters of the detected license plate includes one or more alphanumeric characters.

7. The method of claim 1, further comprising training at least one of the first CNN or the second CNN by utilizing training data comprising a plurality of images depicting license plates disposed in a plurality of environments, wherein the training data excludes any labels or any identifications of key points and/or landmarks of license plate images.

8. The method of claim 7, wherein at least one of:
    training the first CNN comprises training the first CNN exclusively by discovering features included in the training data that correspond to localizing images of license plates within images of environments; or
    training the second CNN comprises training the second CNN exclusively by discovering features included in the training data that are indicative of issuing jurisdictions of license plates and/or sets of characters assigned to and presented on license plates by respective issuing jurisdictions, the discovering of the features excluding segmenting individual characters and/or identifying key points and/or landmarks of license plates depicted within the training data.

9. The method of claim 7, wherein the plurality of images included in the training data includes a plurality of images captured by different devices located at different distances from respective license plates and at different angles of capture with respect to the respective license plates.

10. The method of claim 7, wherein the plurality of images included in the training data includes images in which respective license plates: are at least partially occluded; have one or more broken or damaged characters; respectively correspond to different jurisdictions; are disposed in a respective environment having a level of light below a lighting threshold; and/or are depicted with a respective resolution below a resolution threshold.

11. An image processing system that detects and decodes license plates depicted within images, the image processing system comprising:
    one or more processors;
    one or more tangible, non-transitory computer-readable storage media storing a first convolutional neural network (CNN) trained to detect depictions of license plates within images and storing a second CNN trained to identify at least one of respective issuing jurisdictions or respective sets of characters assigned to and presented on license plates; and
    computer-executable instructions stored on the one or more tangible, non-transitory computer-readable storage media that, when executed by the one or more processors, cause the image processing system to:
    apply the first CNN to a set of data points of an image of an environment to thereby detect and identify a subset of the set of data points that depicts a license plate of a vehicle within the environment image, an indication of the subset of data points depicting the license plate being an output of the first CNN;
    apply the second CNN to the subset of data points indicated by the output of the first CNN to thereby determine, exclusive of character segmentation, at least one of an issuing jurisdiction or a set of characters of the license plate, an indication of the at least one of the issuing jurisdiction or the set of characters of the license plate being an output of the second CNN; and transmit the output of the second CNN or another indication of the identified at least one of the issuing jurisdiction or the set of characters of the license plate to at least one of a computing device or a user interface.

12. The image processing system of claim 11, wherein the application of the second CNN to the subset of data points depicting the license plate of the vehicle within the environment image identifies both the issuing jurisdiction and the set of characters of license plate.

13. The image processing system of claim 11, wherein the application of the second CNN to the subset of data points depicting license plate of the vehicle to thereby identify the at least one of the issuing jurisdiction or the set of characters of license plate is a lone application of the second CNN to the subset of data points depicting the license plate.

14. The image processing system of claim 13, wherein the lone application of the second CNN to the subset of data points depicting the license plate identifies both the set of characters and the issuing jurisdiction of the license plate.

15. The image processing system of claim 11, wherein the indication of the subset of data points depicting license plate comprises a crop of the environment image, the cropped environment image depicting the license plate.

16. The image processing system of claim 11, wherein the set of characters of the license plate includes one or more alphanumeric characters.

17. The image processing system of claim 11, wherein at least one of the first CNN or the second CNN is trained using training data that excludes any labeling of any key points and/or landmarks of license plates depicted within the training data.

18. The image processing system of claim 17, wherein at least one of:
- the first CNN is trained exclusively by discovering features included in the training data that correspond to localizing images of license plates within images of environments; or
- the second CNN is trained exclusively by discovering features included in the training data that are indicative of issuing jurisdictions and/or sets of characters assigned to and presented on license plates by respective issuing jurisdictions, the discovering of the features performed exclusive of any character segmentation and/or any key point and/or landmark identification of license plates depicted within the training data.

19. The image processing system of claim 17, wherein the training data includes a plurality of images depicting license plates disposed in a plurality of environments, the plurality of images captured by different devices located at different distance from respective license plates in different angles of capture with respect to the respective license plate.

20. The image processing system of claim 17, wherein the training data includes a plurality of images in which respective license plates: are at least partially occluded; have one or more broken or damaged characters; respectively correspond to different jurisdictions; are disposed in a respective environment having a level of light below a lighting threshold; and/or are depicted with a respective resolution below a resolution threshold.

* * * * *